(12) United States Patent
Mohan et al.

(10) Patent No.: US 8,607,422 B2
(45) Date of Patent: Dec. 17, 2013

(54) HOSE CLAMP WITH WRAP-AROUND HOSE CLAMP POSITIONER

(75) Inventors: Robert Joseph Mohan, Canton, MI (US); Scott M. Rollins, Canton, MI (US); Robert Howard Saunders, Oak Park, MI (US); Darice M. Morris, Wolverine Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 328 days.

(21) Appl. No.: 13/074,904

(22) Filed: Mar. 29, 2011

(65) Prior Publication Data
US 2012/0246882 A1 Oct. 4, 2012

(51) Int. Cl.
*F16L 33/08* (2006.01)
*F16L 33/04* (2006.01)

(52) U.S. Cl.
USPC ........... 24/279; 24/20 R; 24/274 WB; 285/23

(58) Field of Classification Search
USPC ...... 285/23; 24/16 R, 19, 20 R, 274 WB, 279
See application file for complete search history.

(56) References Cited

U.S. PATENT DOCUMENTS

| | | | | |
|---|---|---|---|---|
| 3,365,218 A | * | 1/1968 | Denyes | 285/253 |
| 3,407,448 A | * | 10/1968 | Tetzlaff et al. | 24/19 |
| 3,454,996 A | * | 7/1969 | Tetzlaff et al. | 24/283 |
| 3,477,106 A | * | 11/1969 | Tetzlaff et al. | 24/279 |
| 6,824,169 B2 | | 11/2004 | Coffman | |
| 6,942,253 B2 | * | 9/2005 | Bowater | 285/23 |
| 7,108,291 B2 | | 9/2006 | Baxi et al. | |
| 7,328,488 B1 | | 2/2008 | Gallo | |
| 7,761,962 B2 | * | 7/2010 | Krauss et al. | 24/279 |
| 2007/0035122 A1 | | 2/2007 | Smith et al. | |
| 2008/0098572 A1 | | 5/2008 | Krauss | |
| 2009/0189389 A1 | * | 7/2009 | Brill et al. | 285/23 |

FOREIGN PATENT DOCUMENTS

FR 2887321 A1 * 12/2006 .............. F16L 33/08

* cited by examiner

*Primary Examiner* — Robert J Sandy
*Assistant Examiner* — Louis Mercado
(74) *Attorney, Agent, or Firm* — Julia Voutyras; Alleman Hall McCoy Russell & Tuttle LLP

(57) ABSTRACT

A hose clamp for forming an air tight seal between a hose and a connector projecting from a housing of an air cooler of a vehicle. The hose clamp including a band which encircles the hose at a location where the hose and the connector overlap and has an adjustable diameter. The hose clamp positioned by a wrap-around hose clamp positioner. The wrap-around hose clamp positioner including flat portions, which contact the outer surface of the hose, and a raised portion where the band passes through a space of the raised portion. The wrap-around hose clamp positioner further including a wrap-around portion and a crimp tab, the wrap-around portion extending over a lip edge of the hose such that the crimp tab pierces through at least the inner surface of the hose.

18 Claims, 3 Drawing Sheets

HOSE CLAMP WITH WRAP-AROUND HOSE CLAMP POSITIONER

BACKGROUND AND SUMMARY

A hose clamp may be used to tightly clamp a hose to a connection piece in an internal combustion engine of a vehicle. In order to operate a hose clamp, the hose clamp is placed around a hose, which is positioned around a connector piece, and the clamp is actuated to tighten around the hose. The hose is then air tightly sealed to the connector piece.

One problem that may arise in using a hose clamp is that the clamp has a tendency to move in a direction perpendicular to the rotation of the clamp tightening. As a result, an operator may be required to use two hands to tighten and position the hose clamp.

Specialized structures for clamp positioning may be provided to improve operation of a hose clamp. For example, US Patent Application 2008/0098572 describes a hose clamp with a spring bridge. The spring bridge is disposed inside of the circular clamping band and the clamping device, and includes a first positioner with a first pair of opposing claws to secure a hose to a connection piece and two stops on either side of the first positioner. Further, the clamp band includes a second positioner with a second pair of opposing claws welded on an opposite side relative to the first positioner. Further still, the clamp band includes a spring arrangement to maintain the tension of the hose clamp.

The inventors herein have recognized various issues with the above system. In particular, increasing the number of hose clamp positioners to secure a hose to a connection piece while maintaining alignment also increases the size and weight of the hose clamp. Further, manufacture of the hose clamp is complex, increasing the cost of the hose clamp. Furthermore, the positioning mechanism is only usable in the specially manufactured hose clamps.

As such, one example approach to address the above issues is to provide a wrap-around hose clamp positioner on a hose clamp that positions the hose clamp relative to a hose. The hose clamp may be tightened to securely engage the hose to a connection piece. The wrap-around hose clamp positioner may engage an outer surface and an inner surface of the hose so as to maintain proper hose clamp alignment. In this way, a hose clamp with a wrap-around hose clamp positioner may be used to secure a hose to a connection piece with a reduced number of features that aid in alignment. Thus, a manufacturing cost is reduced. Further, the wrap-around hose clamp may be provided as a separate piece and may be used interchangeably with different hose clamps.

In one example, an attachment system coupling a hose to a connector, comprises: a band-shaped hose clamp encircling an exterior of the hose around a longitudinal hose axis; a hose clamp positioner extending longitudinally over the hose clamp with a wrap-around portion extending around a hose edge and into an interior of the hose between the hose and the connector. In this way, the wrap-around portion hooks an end of the hose and prevents the hose clamp positioner and the hose clamp from moving or slipping in a direction away from the connector. In another example, a hose clamp positioner for positioning a hose clamp on a hose having a longitudinal axis, comprises: a body including a first section shaped to hold the hose clamp on the hose, the first section extending over the hose clamp, a second wrap-around section turning at least 180° around a hose edge, a stand-off section spacing the first section away from the hose edge, and a piercing end positioned at an end of the second section and pointed back toward the first section. In this way, it is possible to prevent the hose clamp positioner and the hose clamp from moving or slipping in either of a direction toward the connector and a direction away from the connector.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
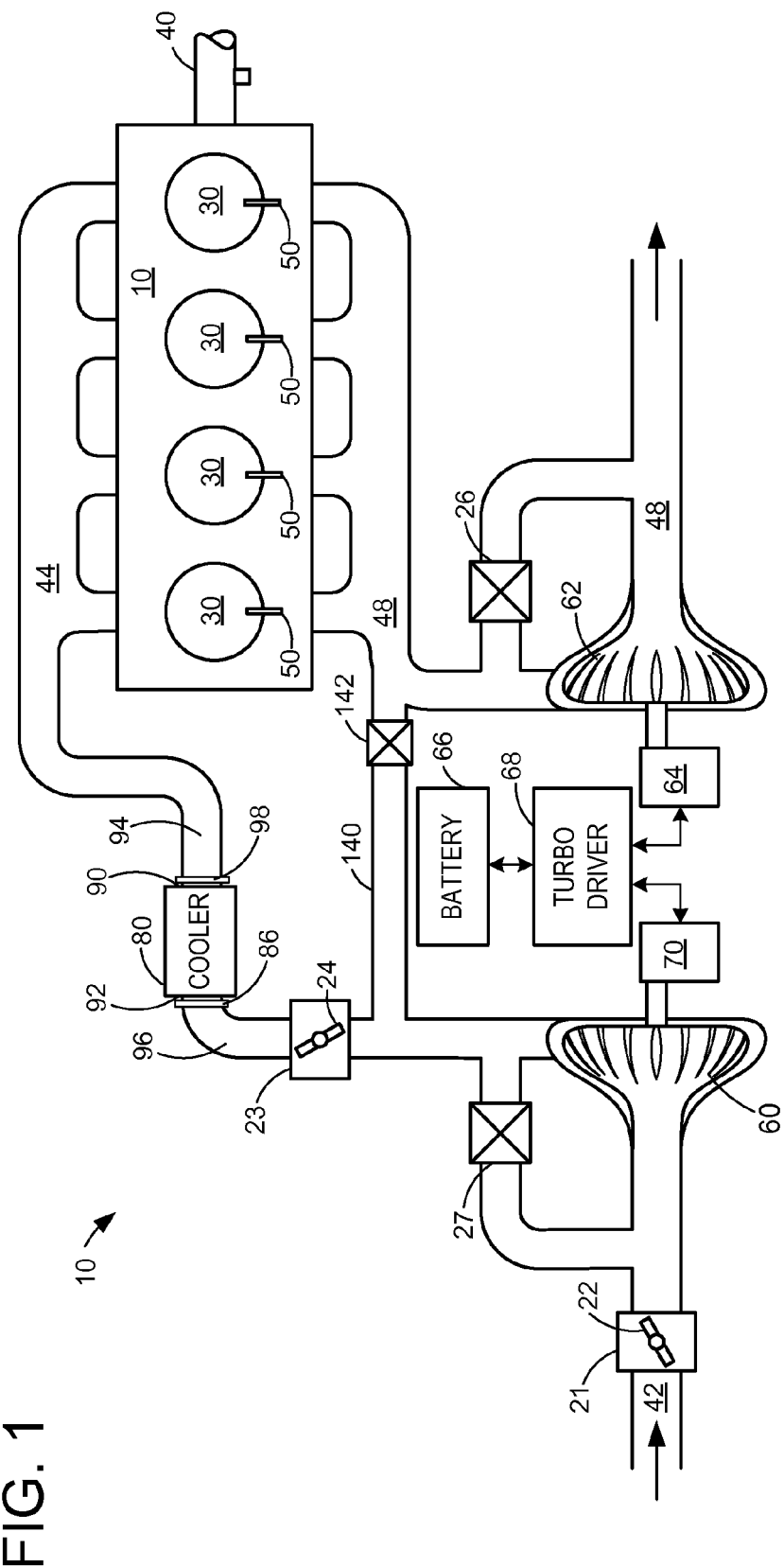
FIG. 1 shows a schematic diagram of an engine including a hose clamp.
Figure 2:
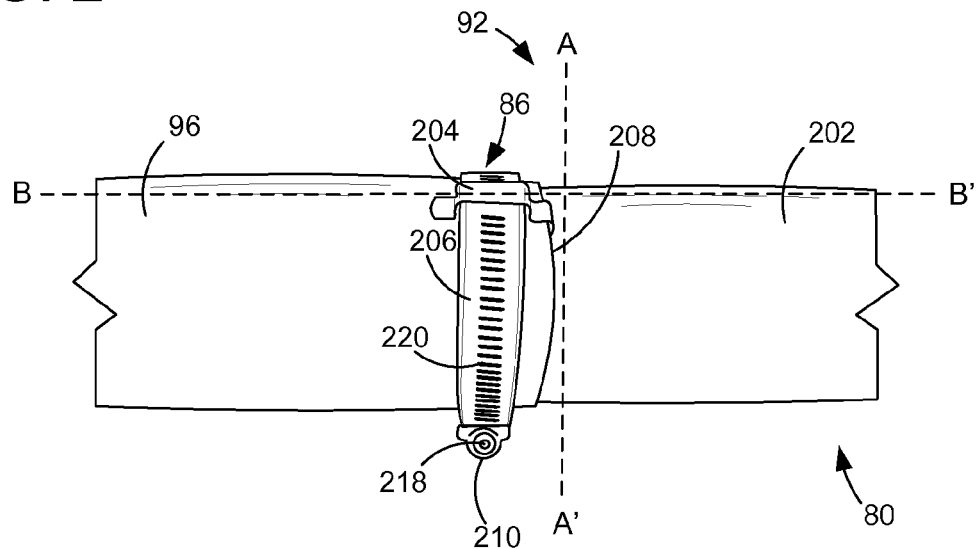
FIG. 2 is an enlarged view of the hose clamp of FIG. 1.
Figure 3:
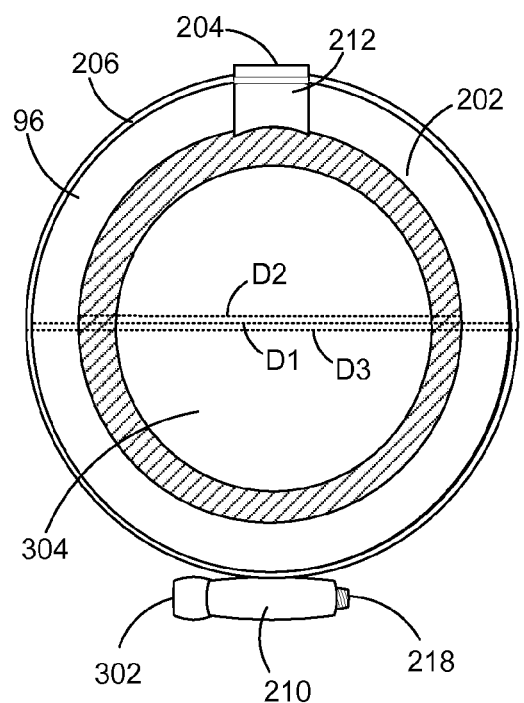
FIG. 3 shows a cross-sectional view of FIG. 2 along line A-A'.
Figure 4:
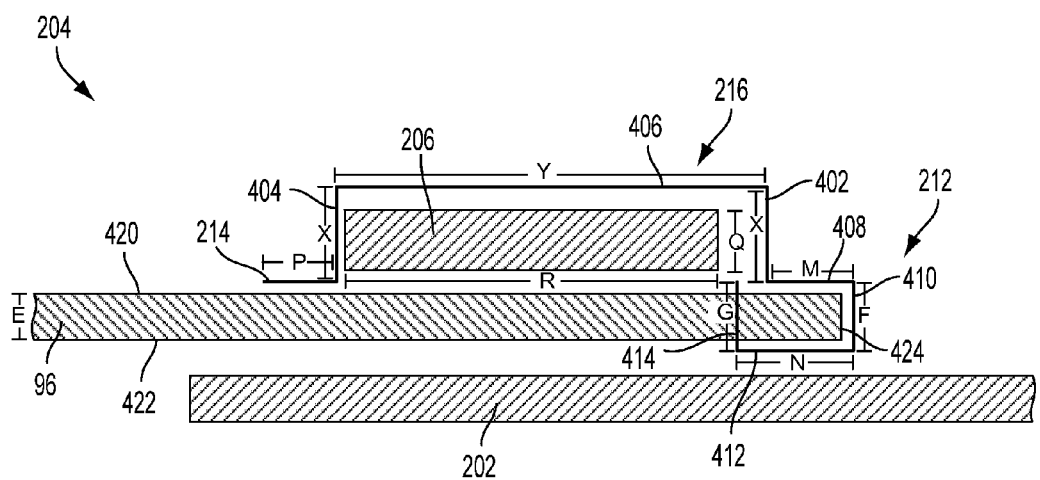
FIG. 4 shows a cross-sectional view of FIG. 2 along line B-B'.
Figure 5:
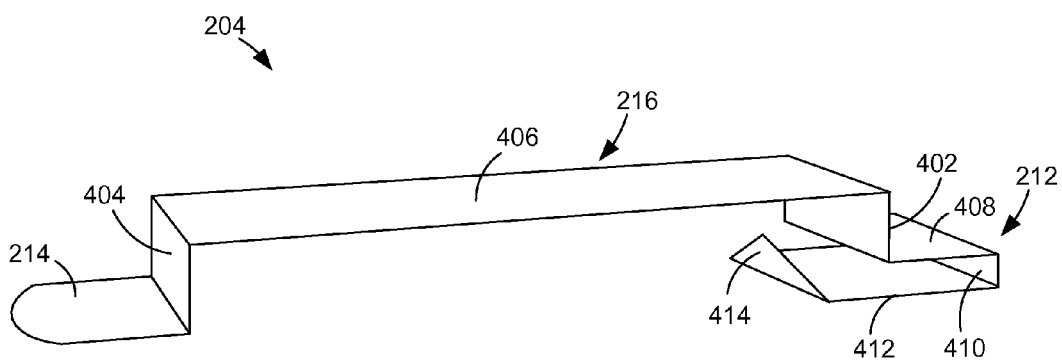
FIG. 5 shows a wrap-around hose clamp positioner of the hose clamp of FIG. 2.

An example embodiment of an engine wherein a hose clamp may be used to secure a hose to a connection piece is shown in FIG. 1. In one specific example a hose clamp may be used to secure a hose on one or both sides of a cooler housing. In this example, a hose clamp with a wrap-around hose clamp positioner encircles one end of a hose, and the end of the hose is fitted over a connector portion on the cooler housing. An example embodiment of a configuration of a hose clamp, a wrap-around hose clamp positioner, a hose, and a connector portion is shown in FIG. 2. Cross sectional views of the example configuration of FIG. 2 are shown in FIGS. 3 and 4. An enlarged view of the wrap-around hose clamp positioner, disengaged from the hose and the hose clamp, is shown in FIG. 5.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 48 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake passage 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by a controller (not shown) via signals provided to an electric motor or actuator included with throttles 21 and 23, a configuration that is commonly referred to as electronic throttle control (ETC). In this manner, throttles 21 and 23 may be operated to vary the intake air provided to combustion chamber 30 among other engine cylinders. Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by the controller (not shown) via EGR valve 142.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by the controller (not shown). In some cases, the turbine 62 may drive, for example, an electric generator 64, to provide power to a battery 66 via a turbo driver 68. Power from the battery 66 may then be used to drive the compressor 60 via a motor 70.

Exhaust passage 48 may include wastegate 26 for diverting exhaust gas away from turbine 62. Additionally, intake passage 42 may include a wastegate 27 configured to divert intake air around compressor 60. Wastegate 26 and/or 27 may be controlled by the controller (not shown) to be opened when a lower boost pressure is desired, for example.

Intake passage 42 further includes a charge air cooler (CAC) 80 (e.g., an intercooler) to decrease the temperature of the turbocharged or supercharged intake gases. In some embodiments, CAC 80 may be an air to air heat exchanger. In other embodiments, CAC 80 may be an air to liquid heat exchanger. CAC 80 includes an inlet side 92 and an outlet side 90. At each of the inlet side 92 and the outlet side 90, a connector portion 202 (shown in FIG. 2) projects from the housing of CAC 80. A hose 96 is coupled to the inlet side 92 and a hose 94 is coupled to the outlet side 90, such that the connectors 202 are inserted inside of the hoses 94 and 96. A hose clamp 86 is provided on the hose 96 at the location of the inlet side 92. A hose clamp 98 is provided on the hose 94 at the location of the outlet side 90. The hose clamps 86 and 98 secure the hoses 96 and 94, respectively, to the housing of CAC 80 in an air tight manner. In an alternate embodiment, only one hose clamp may be used to couple either of the hose 96 or the house 94 to the CAC 80, while the other hose (the other of hose 96 or 94) is coupled by some other means or is integral with the housing of the CAC.

FIG. 2 is an enlarged view of the hose clamp 86 and hose 96 of FIG. 1. It will be appreciated that the hose clamp 98 and hose 94 may have the same configuration. FIG. 3 shows a cross-sectional view of hose clamp 86, hose 96, connector 202, and a wrap-around hose clamp positioner along line A-A' FIG. 2. FIG. 4 shows a cross-sectional view of hose clamp 86, hose 96, connector 202, and wrap-around hose clamp positioner along line B-B' of FIG. 2. FIG. 5 shows a further enlarged view of wrap-around hose clamp positioner 204 disengaged from the hose clamp and the hose. During operation, while securing of the hose to the connector via the hose clamp, the wrap-around hose clamp positioner assists in positioning of the hose clamp so that operation of the hose clamp may be performed more easily. The configuration of the wrap-around hose clamp positioner is discussed in detail below.

Turning first to FIG. 2, hose clamp 86 may be used to securely engage hose 96 to connection piece 202, which projects from the housing of CAC 80. In this embodiment, hose 96 has a diameter D1 which is larger than a diameter D2 of connector 202 (shown in FIG. 3), which is a male receiving end of CAC 80. Thus, the connector 202 fits inside a portion of hose 96. It will be appreciated that in an alternate embodiment, the hose may have a smaller diameter than the connector, and the hose may expand as it is fitted over the connector. It will be further appreciated that in another alternate embodiment, the hose may have a smaller diameter than the connector, and the hose may be fitted inside of the connector.

As shown in FIGS. 2 and 3, hose clamp 86 is positioned around hose 96 at a location where hose 96 and connector 202 overlap. Line B-B' represents a direction of a longitudinal axis of hose 96. Hose clamp 86 includes a band 206 and a worm drive 210. Band 206 is a thin strip which encircles hose 96 and has a thread pattern 220 on its outer surface. Band 206 may be comprised of a metallic material, such as steel. Worm drive 210 may include a threaded screw 218 that engages band 206, such that the threads of the screw align with a thread pattern 220 of the band. The thread pattern may be cut or pressed. When tightened, the screw engages the band and drives the band through the worm drive. A head 302 of the worm drive 210 may be turned to operate the worm drive. As the screw further engages, an adjustable diameter D3 of the band is reduced and the band tightens around the hose and the connector to form a secure attachment. In one example, the hose is comprised of a more flexible material, such as silicone, and the connector is comprised of less flexible material, such as plastic. In this example, the hose may be compressed around the connector to form an air tight seal, while a space 304 of the connector is maintained for airflow.

Referring to FIGS. 2-5, a wrap-around hose clamp positioner 204 includes a flat portion 214, a raised portion 216, and a wrap-around portion 212. The wrap-around hose clamp positioner may be comprised of a rigid material, including a metallic material, such as steel. Flat portion 214 contacts an outer surface 420 of hose 96, such that a surface of the flat portion is parallel to the longitudinal axis of the hose. In this configuration, flat portion 214 is abutted to outer surface 420 of hose 96 and serves to support one end of the wrap-around hose clamp positioner 204, which is opposite relative to a lip edge 208 of hose 96. In alternate embodiments, the flat portion may have a different configuration, such as a wave or a V-shape. Flat portion 214 has a length P. In one embodiment, the length P is 4 mm. It may be appreciated that the length P may be varied without affecting the function of the wrap-around hose clamp positioner.

Raised portion 216 is extended upward from flat portion 214 and outer surface 420 of hose 96 so that it does not impede movement of band 206 as worm drive 210 tightens the hose clamp. A space 430 is provided to accommodate band 206. As shown in FIGS. 4 and 5, raised portion 216 includes two walls 404 and 402, which are perpendicular to the longitudinal axis of the hose, and a top portion 406, which is parallel to the longitudinal axis of the hose. More specifically, raised portion 216 has a height X and a length Y, and the band has a height Q and a length R. Height X is greater than height Q, and length Y is greater than length R, such that the band 206 may be accommodated inside of raised portion 216. In one embodiment, an example of height X is 5 mm, while an example of length Y is 20 mm. Thus, in this embodiment, an example of height Q is 4 mm, while an example of length R is 17 mm. In an alternate embodiment, the raised portion 216 may have an arched configuration rather than the rectangular configuration shown in FIGS. 4 and 5.

Wrap-around portion 212 is located at an opposite end of wrap-around hose clamp positioner 204 relative to flat portion 214, and includes components that engage outer surface 420 of the hose, an end surface 424 of the hose, and an inner surface 422 of the hose. As depicted in FIGS. 2-4, wrap-around portion 212 extends over the lip edge 208 of hose 96 at an end surface 424. As shown in FIGS. 4 and 5, wrap-around end portion 212 includes a flat portion 408, which is a stand-off portion, parallel to the longitudinal axis of the hose. Flat portion 408, like flat portion 214, may be abutted to outer surface 420 of hose 96 and serve to support one end of the wrap-around hose clamp positioner 204, at an opposing side relative to flat portion 214.

An underlying flat portion 412, which is a third flat portion parallel to the longitudinal axis of the hose, is connected to flat portion 408 via a wall 410. Wall 410 is perpendicular to the longitudinal axis of the hose, and may abut end surface 424 of hose 96. Wall 410 has a height F, while the hose 96 has a thickness E, wherein height F is greater than thickness E. In one embodiment, the height F is 4 mm and the thickness E is 3 mm. As such, wall 410 extends past inner surface 422 of hose 96, and underlying flat portion 412 projects inside of hose 96, contacting inner surface 422 of hose 96. Flat portion 408 has a length M, which is less than a length N of the underlying flat portion 412. In one example, the length M is 6 mm and the length N is 7 mm. As such, underlying flat portion 412 projects past wall 402.

In the embodiment depicted in FIGS. 4 and 5, wrap-around portion 212 further includes a piercing end, such as a crimp tab 414, which engages inner surface 422 of hose 96. The crimp tab 414 has triangular shape, wherein a tip of the triangle projects away from underlying flat portion 412 and toward flat portion 408. Further, the crimp tab 414 is perpendicular to the longitudinal axis of the hose. As shown in FIG. 4, crimp tab 414 has a height G, which is greater than the thickness of the hose E, and thus the crimp tab 414 may pierce through hose 96 (from inner surface 422 to outer surface 420). In one embodiment, an example height G is 4 mm. In the embodiment of FIGS. 4 and 5, the length N of the underlying flat portion 412 must be short enough that the crimp tab does not pierce or overlap with the band 206. For example, the length N may be 7 mm, while the length M is 6 mm, the length Y is 20 mm, and the length R is 17 mm. In this example, band 206 has an allowable distance of 1 mm on each side so that it will not be pierced by crimp tab 414.

In an alternate embodiment, the crimp tab may have a height that is less than the thickness of the hose, and thus the crimp tab may only partially pierce the hose. In this embodiment, the length N may be increased such that the crimp tab pierces the inner surface of the hose at a location where the band contacts the outer surface of the hose. In other alternate embodiments, the wrap-around portion may include a different component for engaging the inner surface of the hose, such as a pin, and/or it may include two or more structures for engaging the inner surface, such as two crimp tabs. Further, in some embodiments, the wrap-around portion may lack a component for engaging the inner surface of the hose.

As shown in FIGS. 2 and 3, wrap-around hose clamp positioner 204 may be positioned at a location substantially distal from worm drive 210. In a preferred embodiment, the wrap-around hose clamp positioner is positioned 180° from the worm drive. However, it will be appreciated that the wrap-around hose clamp positioner may be positioned elsewhere. Further, the present embodiment shows only one wrap-around hose clamp positioner engaged with the band of the hose clamp; however, it will be appreciated that two or more wrap-around hose clamp positioners may be used for positioning of the hose clamp. Furthermore, the wrap-around hose clamp positioner may be used in combination with other positioning, tightening, or securing devices and structures.

The above described wrap-around hose clamp positioner allows for the band of the hose clamp to move freely through the wrap-around house clamp positioner and around the outer surface of a silicone hose. The crimp tab at the piercing end of the wrap-around house clamp positioner pierces the silicone hose to maintain a position. The crimp tab pierces the silicone hose at a location which is proximal to the band. Thus, compression of the band aids in the piercing action of the crimp tab through the inner and outer surfaces of the hose. As such, the band may be held in place and tightened via a worm drive. The silicone material of the hose may then be compressed as the hose clamp is tightened around a connector portion of a cooler housing, forming an air and liquid tight seal. In alternate embodiments, the described hose clamp and wrap-around hose clamp positioner may be used on hoses in attached to other vehicle components, such as a throttle body, a turbocharger, a supercharger, an engine air cleaner, a radiator, a thermostat, a water pump, etc.

Such a hose clamp positioner is beneficial in that is provides secure and repeatable positioning of a hose clamp on a hose. In one example, while attempting to tighten a hose clamp without the hose clamp positioner, the hose clamp may slip toward the connector, either forming a weak seal on the edge of the hose or tightening only around the connector, thereby failing to seal the hose and the connector. In another example, while attempting to tighten a hose clamp without the hose clamp positioner, the hose clamp may slip away from the connector, either forming a weak seal on the edge of the connector or tightening only around the hose, thereby failing to seal the hose and the connector.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An attachment system, comprising:
a band-shaped hose clamp encircling an exterior of a hose around a longitudinal hose axis;
a hose clamp positioner extending longitudinally over the hose clamp with a wrap-around portion extending around a hose edge and into an interior of the hose between the hose and a connector, and a piercing end at an end of the wrap-around portion in the interior of the hose piercing through the exterior of the hose.

2. The system of claim 1, wherein the hose clamp positioner has a stand-off portion that spaces the hose clamp away from the hose edge.

3. The system of claim 1, wherein the hose clamp positioner includes a raised portion to accommodate a band of the hose clamp.

4. The system of claim 1, wherein the connector is a connector portion of an engine component housing.

5. The system of claim 1, wherein the connector is positioned inside the hose.

6. The system of claim 1, wherein a band of the hose clamp has a thread pattern on an outer surface of the band, and wherein the hose clamp further includes a worm drive including a screw engaging the thread pattern for decreasing a diameter of the band.

7. The system of claim 6, wherein the hose clamp positioner includes: a first flat portion, the first flat portion parallel with the longitudinal hose axis and contacting an outer surface of the hose, a raised portion having a space which accommodates the band, the wrap-around portion comprising a second flat portion, a first perpendicular wall, and a third flat portion, the second flat portion parallel with the longitudinal hose axis and contacting the outer surface of the hose, the first perpendicular wall being perpendicular to the longitudinal hose axis and abutting an end surface of the hose, the third flat portion being parallel with the longitudinal hose axis and contacting an inner surface of the hose.

8. The system of claim 7, wherein the raised portion comprises a pair of perpendicular walls and a top portion bridging the pair of perpendicular walls at one end of the pair of perpendicular walls, each opposing end of the pair of perpendicular walls connected to one of the first flat portion and the second flat portion, the pair of perpendicular walls perpendicular with the longitudinal axis of the hose, and the top portion parallel with the longitudinal axis of the hose.

9. The system of claim 7, wherein the wrap-around portion of the hose clamp positioner further comprises the piercing end, the piercing end including a crimp tab perpendicular to the longitudinal hose axis.

10. The system of claim 9, wherein the crimp tab has a triangular shape and a point of the triangular shape is directed toward the raised portion.

11. The system of claim 6, wherein the worm drive is positioned on the hose clamp on an opposing side relative to the hose clamp positioner.

12. A hose air tightly sealed to a connector, the connector inserted inside of the hose, the hose compressed around the connector via a hose clamp, the hose clamp comprising:
a band encircling the hose at a location where the hose and the connector overlap, an outer surface of the band having a thread pattern, an inner surface of the band in contact with an outer surface of the hose, a diameter of the band being adjustable;
a worm drive coupled to the band, the worm drive including a screw engaged with the thread pattern on the outer surface of the band, the screw being rotatable to adjust the diameter of the band; and
a wrap-around hose clamp positioner on an opposite side of the hose clamp relative to the worm drive, the wrap-around hose clamp positioner comprising,
a first flat portion, the first flat portion parallel with a longitudinal axis of the hose and contacting the outer surface of the hose,
a wrap-around portion, the wrap-around portion including a second flat portion, a first perpendicular wall, and a third flat portion, the second flat portion being parallel with the longitudinal axis of the hose and contacting the outer surface of the hose, the first perpendicular wall being perpendicular to the longitudinal axis of the hose and abutting an end surface of the hose, the third flat portion being parallel with the longitudinal axis of the hose and contacting an inner surface of the hose,
a raised portion with a space for accommodating the band, the raised portion including a pair of perpendicular walls and a top portion, the top portion bridging the pair of perpendicular walls and connected to one end of the pair of perpendicular walls, an opposing end of the pair of perpendicular walls connected to the first flat portion and the second flat portion, the pair of perpendicular walls perpendicular relative to the longitudinal axis of the hose and the top portion parallel with the longitudinal axis of the hose, and
a crimp tab, the crimp tab being perpendicular relative to the longitudinal axis of the hose and piercing the inner surface of the hose, one end of the crimp tab connected to the third flat portion and an opposing end of the crimp tab projected toward the raised portion, wherein a height of the crimp tab is greater than a thickness of the hose, the crimp tab piercing through the outer surface of the hose.

13. The hose air tightly sealed to the connector of claim 12, wherein the crimp tab has a triangular shape and a point of the triangular shape is directed toward the raised portion.

14. The hose air tightly sealed to the connector of claim 12, wherein a length of the second flat portion is less than a length of the third flat portion, and the crimp tab projects toward the raised portion at a location that is between the pair of perpendicular walls.

15. The hose air tightly sealed to the connector of claim 12, wherein the hose clamp and the wrap-around hose clamp positioner are comprised of steel.

16. The hose air tightly sealed to the connector of claim 12, wherein the hose is comprised of silicone and the connector is comprised of plastic.

17. The hose air tightly sealed to the connector of claim 12, wherein the connector projects from a housing of an air cooler of a vehicle.

18. A hose clamp positioner positioning a hose clamp on a hose having a longitudinal axis, the hose clamp including a band encircling the hose and a tightening mechanism for decreasing a diameter of the band, the hose clamp positioner comprising:
a body including,
a first section shaped to hold the hose clamp on the hose, the first section extending over the hose clamp and providing a space for the hose clamp to move freely through the hose clamp positioner;
a second wrap-around section turning at least 180° around a hose edge;

a stand-off section spacing the first section away from the hose edge; and a piercing end positioned at an end of the second wrap-around section and pointed back toward the first section, the piercing end having a height greater than a thickness of the hose, wherein tightening of the band applies direct compression force to push the hose into the piercing end to maintain a desired position of the hose.

* * * * *